C. BUCKWALTER.
Harvester Rake
No. 99,397.　　　　　　　　　　　　　　　　Patented Feb. 1, 1870.
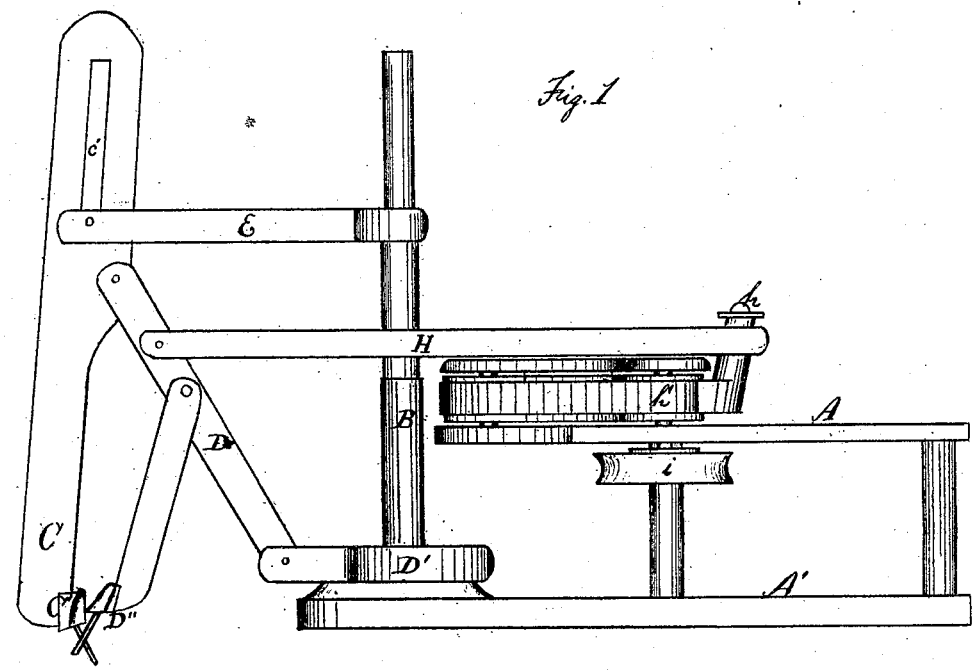
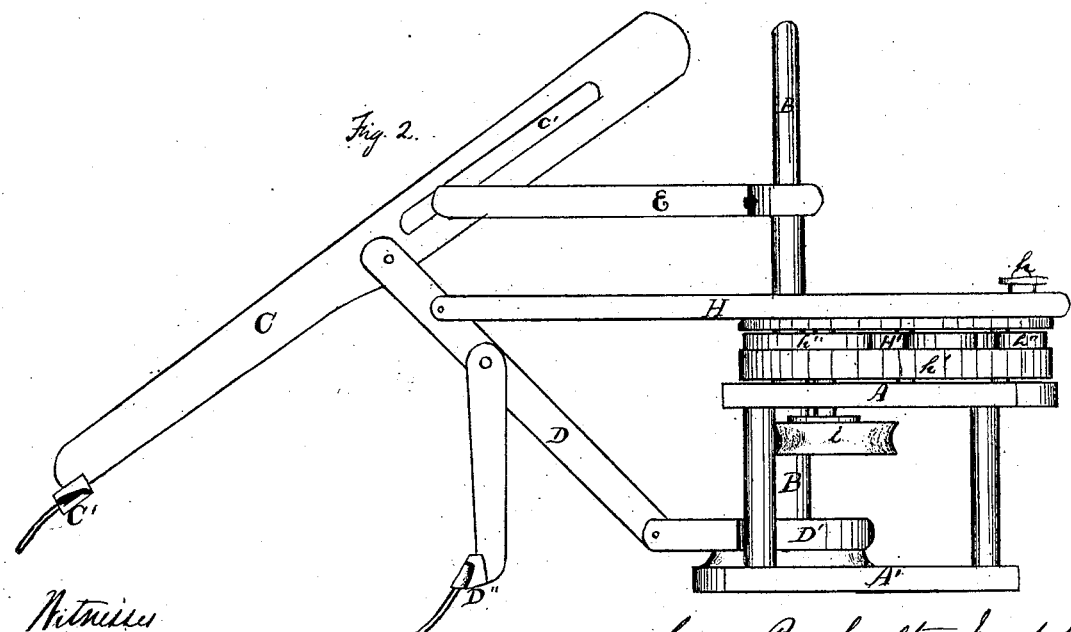

UNITED STATES PATENT OFFICE.

CYRUS BUCKWALTER, OF DAVENPORT, IOWA.

IMPROVEMENT IN HARVESTER-RAKES.

Specification forming part of Letters Patent No. 99,397, dated February 1, 1870.

*To all whom it may concern:*

Be it known that I, CYRUS BUCKWALTER, of Davenport, in the State of Iowa, have invented a new and useful Improvement in Harvester-Rakes; and I do hereby declare that the following is a full, clear, and exact description of the same, reference being had to the accompanying drawings, and letters of reference marked thereon, making a part of this specification, in which—

Figure 1 is a side elevation showing the raking apparatus closed, and Fig. 2 an elevation showing the same open.

This invention has for its object the automatic raking of cut grain from harvester-tables.

To enable those skilled in the art to make and use my invention, I now proceed to describe its construction and operation.

Similar letters in the drawings refer to like parts.

The invention consists in an apparatus receiving motion from the master-wheel, and affixed to a harvester, which causes a swinging rake to pass across the table, gathering the grain in its passage and compressing it against a fixed rake, and then to pass off the table, in company with the fixed rake, the two bearing the gavel between them, and then causes said rakes to separate and return to the position whence they may co-operate to form the next gavel.

In the drawings, A A' are upper and lower platforms, by which the apparatus is both sustained and attached to the reaper. B is an upright standard projecting from an offset of the lower platform. C' is the swinging rake affixed to the lower end of a bar, C, which is pivoted to the upper end of an inclined arm, D, the lower end of which is jointed in a collar, D', that encircles the standard B and rests upon the lower platform.

The swinging bar C is guided in its motion by a bar, E, loosely placed upon and projecting horizontally from the upper part of the standard B, and resting upon a shoulder of the same, and bifurcated at its outer end, so as to receive the bar C, which is slotted lengthwise at $c'$, and connected with the guide-bar by a pin passing through the forks of the latter, and also through the slot $c'$.

The inclined brace D bears a fixed rake, D'', which stands, during the gathering of the gavel, at the inner side of the table.

The guide-bar E and collar D' impart to the rakes their horizontal motion in carrying the gavel off and returning to their places.

To the inclined brace D is jointed one extremity of a pitman, H, which, inclosing the standard A in a slot, is jointed, at its other extremity, to a vertical pin, $h$, affixed to a belt, $h'$, which passes around a horizontal pulley-block, H', fixed upon the upper side of the platform A, and bearing sheaves $h''$ at its ends and convex sides, for the belt to run on.

One of the sheaves is connected, by a shaft passing down through the upper platform, with a pulley, $i$, which receives motion from the master-wheel, and communicates such motion to the belt $h'$. Hence the pin $h$ and the end of the pitman H are borne, on the belt, around the block H'.

As the pin traverses the convex side of the block, it imparts to the raking apparatus the lateral motion that carries it off the table with the gavel, and as the pin traverses the block's concavity, it draws the raking apparatus over the table again.

During the transit of the pin across the ends of the block, it gives the rake C' its swinging motion to and from the fixed rake D''.

I claim as my invention—

1. The rake-bars C D, guide-bar E, collar D', pitman H, standard B, pulley and block H', belt and pin $h\ h'$, and platforms A A', all combined and arranged as and for the purpose specified.

2. The standard B, rotating guide-bar E, rotating collar D', reciprocating pitman H, pulley-block H', and belt and pin $h\ h'$, all combined and arranged as and for the purpose specified.

3. The rotating guide-bar E, rotating collar D', and rake-bars C D, constituting a horizontally-moving apparatus, constructed and combined as and for the purpose explained.

CYRUS BUCKWALTER.

Witnesses:
ABNER DAVISON,
JOS. P. MILLER.